United States Patent [19]
Lawrence

[11] Patent Number: 6,015,584
[45] Date of Patent: Jan. 18, 2000

[54] DOUGH BALL LOADER AND METHOD OF FLATTENING A DOUGH BALL

[75] Inventor: Eric Clay Lawrence, South El Monte, Calif.

[73] Assignee: Lawrence Equipment, South El Monte, Calif.

[21] Appl. No.: 09/044,520

[22] Filed: Mar. 19, 1998

[51] Int. Cl.[7] .............................. A21C 9/08; A21C 11/00
[52] U.S. Cl. ...................... 426/502; 426/517; 425/364 R; 425/409
[58] Field of Search ................................. 425/364 R, 397, 425/324.1, 340, 409, 385; 426/496, 502, 517

[56] References Cited

U.S. PATENT DOCUMENTS

| | | | |
|---|---|---|---|
| Re. 34,530 | 2/1994 | Kirkpatrick | 425/364 R |
| 2,478,676 | 8/1949 | Temple, Sr. | 425/409 |
| 4,668,524 | 5/1987 | Kirkpatrick | 425/364 R |
| 4,905,581 | 3/1990 | Kirkpatrick . | |
| 4,934,513 | 6/1990 | Kirkpatrick et al. . | |
| 5,231,919 | 8/1993 | Lawrence et al. | 425/364 R |
| 5,252,055 | 10/1993 | Mangiavacca | 425/340 |

*Primary Examiner*—Robert Davis
*Assistant Examiner*—Thukhanh T. Nguyen
*Attorney, Agent, or Firm*—Lyon & Lyon LLP

[57] ABSTRACT

A dough ball loader includes a conveyor belt supported on a frame. A frame plate is fixed in position over the conveyor belt. Loading tubes on the frame plate are aligned over a loading opening in the frame plate. Pairs of flatteners are pivotably attached to the frame plate adjacent to the loading opening. The flatteners preferably have a flat bottom surface. An actuator is linked to the flatteners and pivots the flatteners from an open position for loading dough balls onto the conveyor belt, to a closed position, for flattening the dough balls and fixing them into position on the belt.

12 Claims, 3 Drawing Sheets

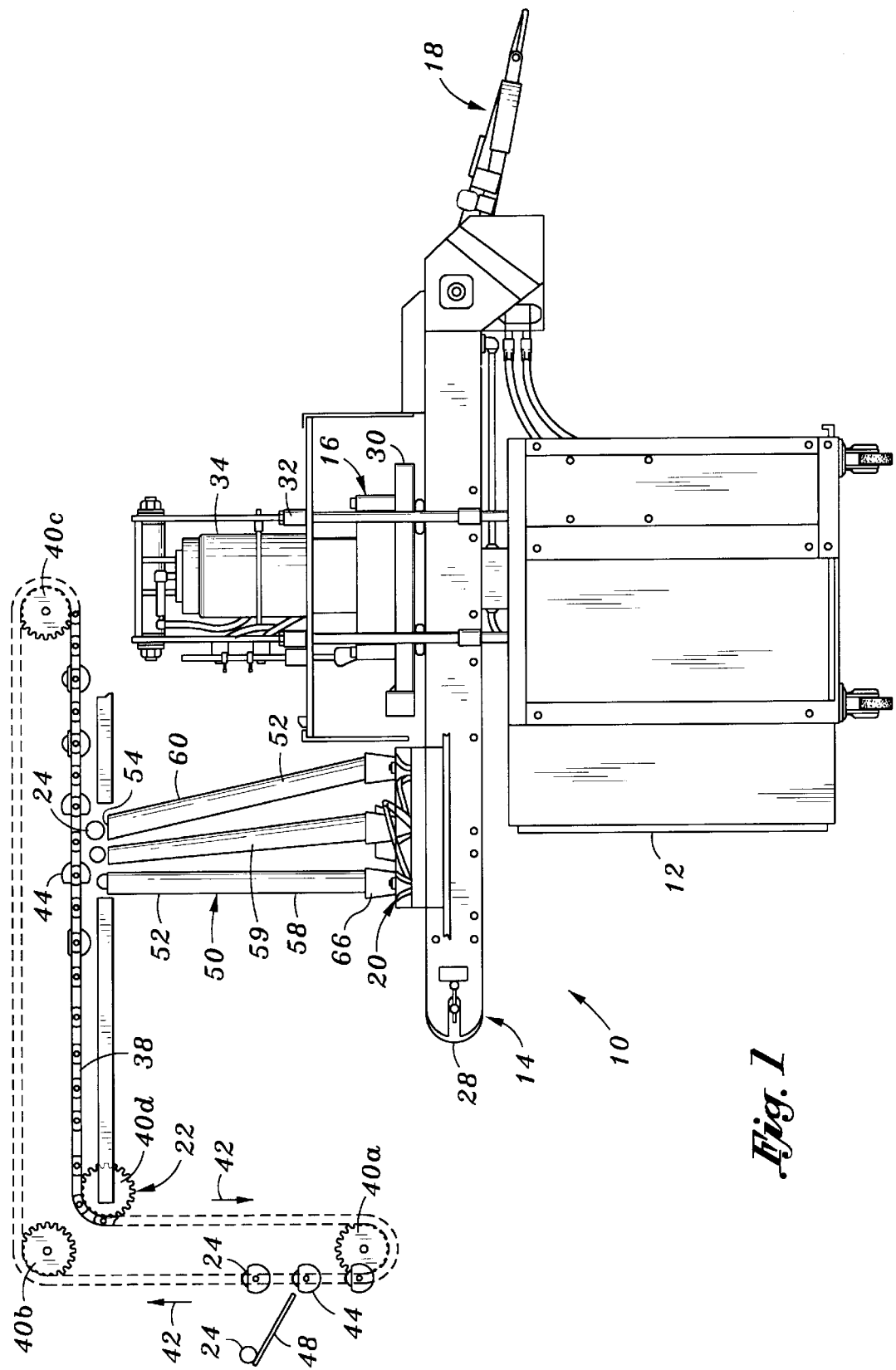

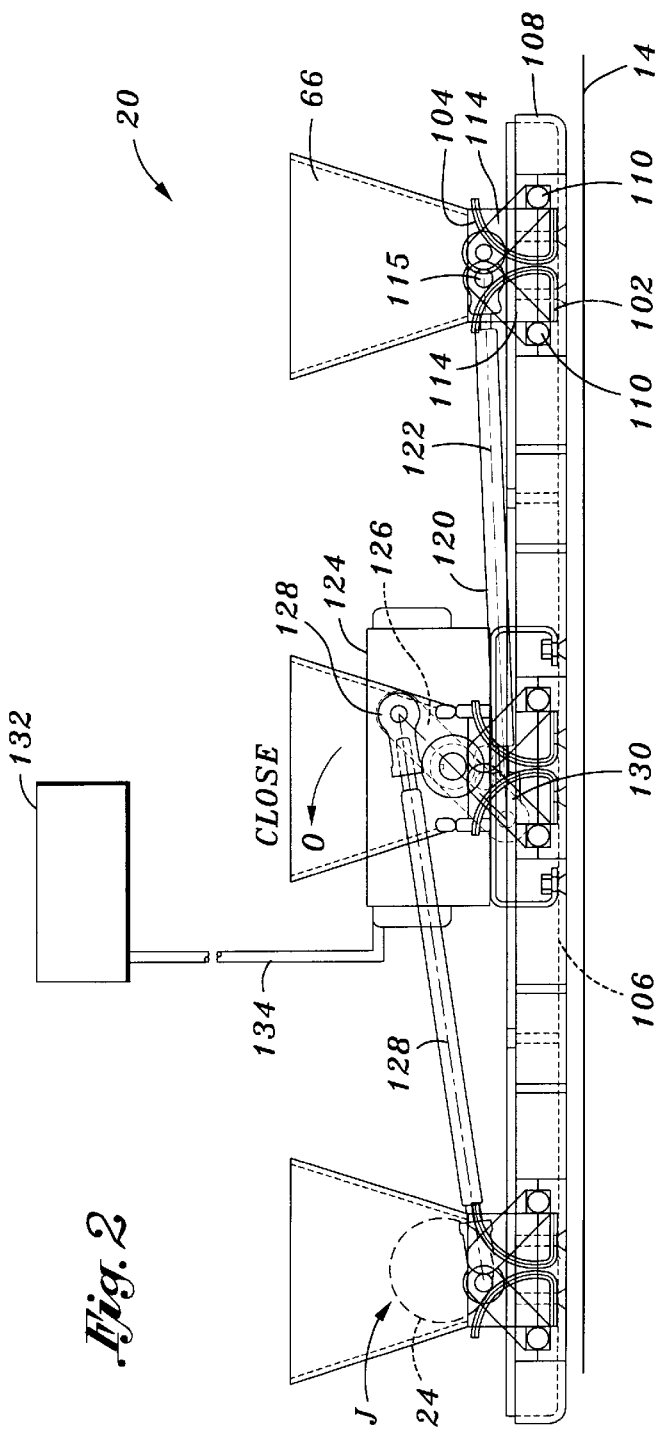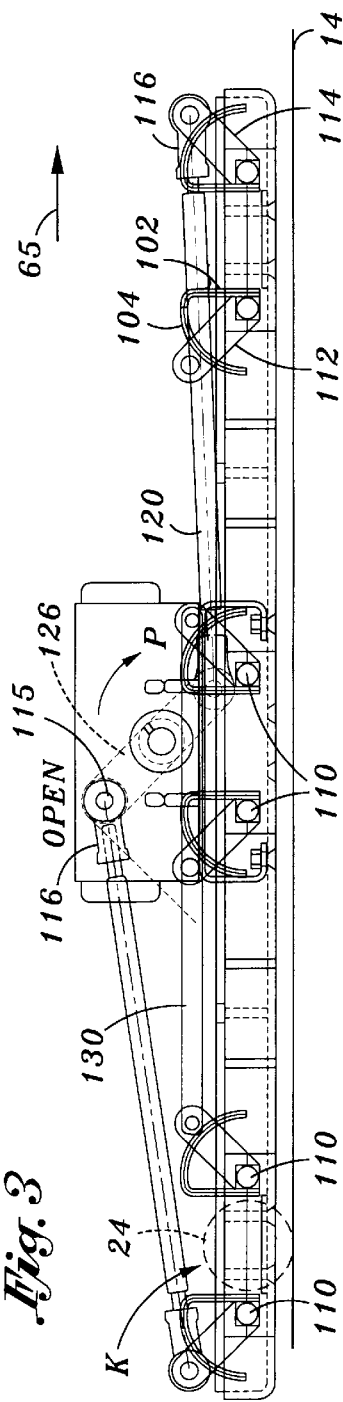

DOUGH BALL LOADER AND METHOD OF FLATTENING A DOUGH BALL

BACKGROUND OF THE INVENTION

The field of the invention is methods and machinery for processing and handling dough balls, and particularly dough balls used for production of tortillas.

Tortillas have traditionally been made by hand. However, this is a highly labor intensive operation unsuitable for large volume commercial production. In automated commercial production of tortillas, the ball of dough which ultimately forms the tortilla is positioned on a flat conveyor belt. This individual positioning is also labor intensive, and because of the higher speeds needed for high volume production, hand placing dough balls does not always provide uniform spacing. Consequently, when the dough balls are pressed flat, they may overlap, forming a "figure-8", which must be rejected as waste.

To better facilitate automated production of tortillas, various machines have been proposed and used. See for example, U.S. Pat. No. Re. 34,530, incorporated herein by reference. While the machine described in this patent, for example, has performed well in the past, disadvantages remain in consistently placing and pressing dough balls. In the machine shown in U.S. Pat. No. Re. 34,530, occasionally, when the slide plate lifts up, a dough ball will roll out of position, resulting in waste. Accordingly, there is a need for an improved machine for handling dough balls.

SUMMARY OF THE INVENTION

To these ends, a dough ball processing machine includes a conveyor belt, and a frame plate above the belt. First and second flatteners are advantageously pivotably attached to the frame plate. In a preferred embodiment, an actuator is linked at least indirectly to one of the flatteners. Each flattener preferably has a flat bottom surface, for flattening dough balls, The flatteners are advantageously pivotable from an open position wherein the bottom surface of each flattener is generally vertical, to a closed position wherein the preferably flat bottom surface of each flattener is substantially horizontal and parallel to the conveyor belt. Other and further objects and advantages will appear hereinafter.

BRIEF DESCRIPTION OF THE DRAWINGS

In the drawings, wherein similar reference characters denote similar elements throughout the several views:

FIG. 1 is a side elevation view of a dough ball machine;

FIG. 2 is a side elevation view of the dough ball loader of the invention, in the closed position;

FIG. 3 is a side elevation view thereof showing the loader in the open position.

DETAILED DESCRIPTION OF THE PREFERRED EMBODIMENT

Figure 4:
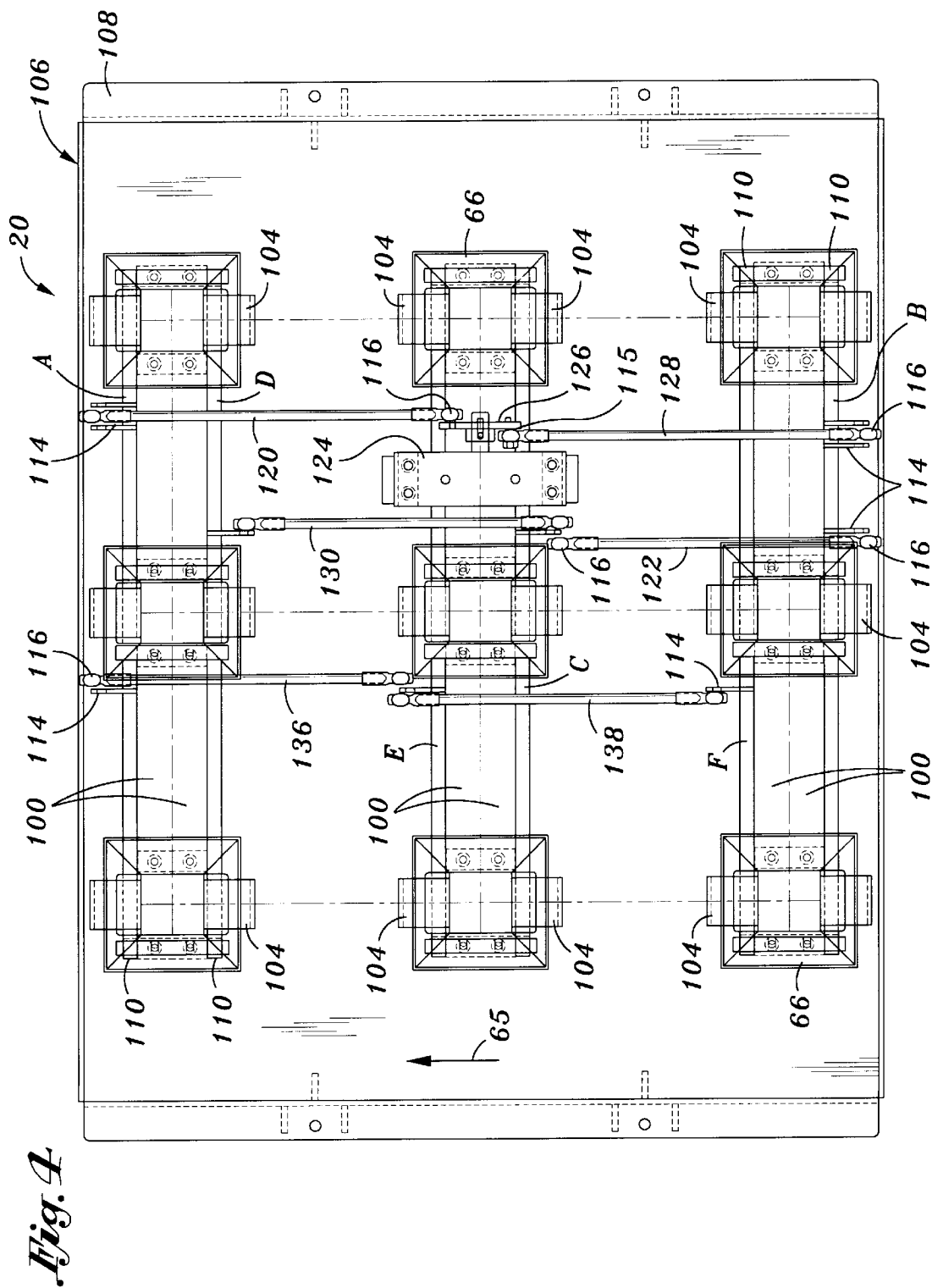
FIG. 4 is a plan view of the loader shown in FIGS. 2 and 3.

As shown in FIG. 1, in a preferred embodiment, the machine 10 includes a frame 12, a conveyor belt 14 on the frame 12, a parbaking press unit 16 and a discharge conveyor 18. A dough ball loader 20 is mounted above the conveyor belt 14. A proofer or dough relaxation conveyor 22 is positioned over the loader 20 and supplies dough balls 24 to the loader.

The conveyor belt 14 is preferably a flat press belt supported around two end rollers 28 (with only the left end roller shown). The belt 14 advantageously is sufficiently wide to accommodate the desired number of rows of tortillas being formed, typically from one to five rows.

The parbaking press unit 16 includes a pressing platen 30 mounted on a support 32 and operated by a platen operating cylinder 34. The platen 30 is forced downwardly to fully flatten the dough balls 24 to form the tortilla into its final shape. The platen 30 is heated and also serves to parbake the tortillas.

The relaxation conveyor 22 includes a chain 38 of dough ball cups or buckets 44, sufficiently long to provide the time duration desired for allowing the dough balls to relax, as is well known in the baking art. The chain 38 passes over sprockets 40a–40d, moving the buckets 44 is the direction of the arrow 42. The buckets 44 are pivotably supported on the chain. Each of the buckets is eccentrically pivoted, and is unloaded by automatically pivoting to dump the dough ball 24 into the loader 20. The dough balls 24 are loaded onto the relaxation conveyor 22 via a loading chute 48 provided with dough balls from a dough ball manufacturing machine (not shown). The travel time from loading the dough ball 24 at the chute 48 until the dough ball 24 is dumped into the loader 20 is generally about 10 minutes, i.e., sufficient time for the dough to relax.

The loader 20 cooperates with a transfer tube unit 50 which supplies the dough balls 24 from the relaxation conveyor 22 to the loader 20. The transfer tube unit 50 includes transfer tubes 52, each having a top entrance opening 54 and a bottom discharge opening 66. Multiple sets of transfer tubes may be provided, depending upon the number of rows of dough balls to be handled by the apparatus 10. As shown in the figures, in the preferred embodiment, three sets of transfer tubes 58, 59, and 60 are used. Each set includes three spaced apart tubes 52.

Referring now to FIGS. 2, 3 and 4, the loader 20 includes pairs of opposing flatteners 100. Each flattener 100 preferably has a flat bottom surface 102 and a curved upper surface 104. The flatteners 100 are pivotably attached to an end frame 108 of a frame plate 106, on pivot bearings 110.

The frame plate 106 is supported on the frame 12 of the apparatus 10, and is fixed in position relative to the conveyor 14.

The flatteners 100 are irrotatably attached to end links 114, which in turn are pivotably attached to rod ends 116 via a pin or bolt 115. An actuator 124 is mounted on top of the frame plate 106 and drives the flatteners 100, periodically causing the flatteners 100 to pivot open and closed, with the sequence and timing synchronized with the conveyor 14. The actuator 124 may be electrically or pneumatically powered.

Mechanical linkages extend between the actuator 124 and each flattener, so that each flattener opens and closes, driven directly or indirectly by the actuator 124. Various equivalent linkages and arrangements may be used for this purpose. As shown in FIGS. 2–4, preferably, the actuator includes an actuator arm 126. A first drive rod 120 extends from one end of the actuator arm 126 to an end link 114 fixed to the flattener 100 and marked A in FIG. 4. A second drive rod 128 attaches to the other end of the actuator arm 126 and to an end link 114 on the flattener 100 marked B in FIG. 4. The mechanical chain of actuation continues by connecting flattener B to flattener C via a first follower rod 122, connecting flattener C to flattener D via a second follower rod 130, connecting flattener A to flattener E via a third follower rod 136, and by connecting flattener E to flattener F via a fourth follower rod 138. Alternatively, multiple actuators may be used.

In operation, dough balls are loaded into the transfer tubes 52, and described in Re. 34,530. The flatteners 100 are in the closed position, as shown in FIG. 2. The dough balls fall through the tubes 52 and come to rest on the curved upper surfaces 104 of the flatteners, as shown in phantom in FIG. 2. The conveyor belt 14 is stopped. The actuator 124 pivots the actuator arm 126 in the direction of arrow O in FIG. 2, causing all of the flatteners 100 to open into the position shown in FIG. 3. The actuator 124 is controlled by a pneumatic valve 132 linked to the actuator 124 by a pair of hoses 134.

After the flatteners 100 are sufficiently open, the dough ball 24 falls from position J shown in FIG. 2, to position K, shown in FIG. 3, with the dough ball 24 now resting on the conveyor 14. The controller 132 then causes the actuator 124 to reverse, driving the actuator arm 126 in the direction P shown in FIG. 3. This causes all of the flatteners 100 to close. The flat bottom surfaces 102 of the flatteners 100 press the dough balls 24 flat onto the conveyor 14. The flattened dough balls 24 are then substantially fixed in position on the conveyor belt 14 and cannot shift or become displaced during subsequent operations. This reduces waste.

After flattening, the flatteners 100 are once again opened, with the flat bottom surfaces peeling away from the top surface of the flattened dough ball 24. The belt 14 then advances, carrying the flattened dough balls to the parbaking unit 16.

When the flatteners 100 are in the closed position, as shown in FIG. 2, the flat bottom surfaces 102 are substantially flush with plate 106. The frame plate 106 remains fixed in the lower position during pre-pressing. As movement of the frame plate 106 during pre-pressing is avoided, inadvertent displacement of dough balls is reduced.

Thus, although a single embodiment has been shown and described, it will be apparent that many modifications and changes, and substitutions of equivalents may be made, including other sequences of operation, without departing from the spirit and scope of the invention. The invention, therefore, should not be restricted, except by the following claims.

What is claimed is:

1. A dough ball processing machine comprising:
   a conveyor belt;
   a frame plate above the belt, the frame plate having a plurality of spaced apart openings passing through it;
   a first flattener and a second flattener pivotably attached to the frame plate at each of the openings; and
   an actuator linked at least indirectly to the first and second flattener.

2. The machine of claim 1 wherein each flattener comprises a flat bottom surface.

3. The machine of claim 2 wherein each flattener comprises a curved upper section.

4. The machine of claim 2 wherein each flattener is pivotable from an open position wherein the flat bottom surface is substantially vertical, to a closed position wherein the flat bottom surface is substantially horizontal.

5. The machine of claim 2 wherein the flat bottom surface of each flattener comprises a non-stick material.

6. The machine of claim 1 further comprising a third flattener and a fourth flattener pivotably attached to the frame plate, with one of the third and fourth flatteners linked to one of the first and second flatteners.

7. A dough ball loader comprising:
   a conveyor belt supported on a frame;
   a frame plate in a fixed position over the conveyor belt;
   a loading tube on the frame plate aligned over a loading opening in the frame plate;
   a first flattener pivotably attached to the frame plate adjacent to the loading opening, the flattener having a flat bottom surface; and
   an actuator linked to the first flattener for pivoting the flattener from a first position wherein the flat bottom surface is generally vertical and the loading opening is open, to a second position wherein the flat bottom surface is generally parallel to the belt and the loading opening is closed off by the flattener.

8. A dough ball processing machine, comprising:
   a frame plate;
   a first flattener and a second flattener pivotably attached to the frame plate;
   a single actuator linked at least indirectly to the first and second flatteners, such that operation of the actuator simultaneously pivots both the first and the second flatteners.

9. A dough ball processing machine, comprising:
   a frame plate;
   a first flattener pivotably attached to the frame plate at a first pivot point, the first flattener having a flat bottom section;
   a second flattener pivotably attached to the frame plate at a second pivot point, the second flattener having a flat bottom section;
   with the first pivot point spaced apart from the second pivot point by a distance substantially equal to the combined lengths of the flat bottom sections of the first flattener and the second flattener; and
   an actuator linked at least indirectly to the first flattener and to the second flattener.

10. A method for flattening a doughball, comprising the steps of:
    pivoting a pair of opposing flatteners into a closed position;
    dropping the dough ball down a tube, onto curved upper surfaces of the opposing pair of flatteners, with the flatteners in the closed position;
    pivoting the flatteners in mutually opposite directions into an open position, with the doughball supported on the curved upper surfaces, and thereby creating an opening between the flatteners;
    allowing the doughball to fall through the opening and onto a conveyor;
    pivoting the flatteners to return them to the closed position;
    flattening the doughball by having the flatteners press the doughball down onto the conveyor.

11. The method of claim 10 further comprising the step of:
    pivoting the flatteners into the closed position simultaneously.

12. The method of claim 10 further comprising the step of allowing the doughball to spread radially outwardly as it is flattened.

* * * * *